United States Patent [19]

Macmillan

[11] 4,076,473
[45] Feb. 28, 1978

[54] RETREAD MOLD WITH LOCKING MEANS

[76] Inventor: Kenneth T. Macmillan, 4992 Wesleyan Woods Dr., Macon, Ga. 31204

[21] Appl. No.: 746,120

[22] Filed: Nov. 30, 1976

[51] Int. Cl.² .............................................. B29H 5/04
[52] U.S. Cl. ...................................... 425/19; 425/24; 425/36; 425/47
[58] Field of Search ........................ 425/17, 18, 19, 20, 425/21, 22, 29, 30, 33, 34, 36, 44, 38, 58; 18/2 T; 144/288

[56] References Cited

U.S. PATENT DOCUMENTS

| 2,291,506 | 7/1942 | Shook et al. | 425/38 |
| 2,866,500 | 12/1958 | George et al. | 144/288 X |
| 3,128,807 | 4/1964 | Kilgore | 144/288 |
| 3,184,794 | 5/1965 | Sherkin | 425/19 |
| 3,214,790 | 11/1965 | Wright et al. | 425/47 |
| 3,214,791 | 11/1965 | Ericson et al. | 425/29 |
| 3,701,615 | 10/1972 | Johnson | 425/36 X |
| 3,990,822 | 11/1976 | MacMillan | 425/19 X |

FOREIGN PATENT DOCUMENTS 269,016   7/1966   Australia ................................. 425/19

*Primary Examiner*—J. Howard Flint, Jr.
*Attorney, Agent, or Firm*—Diller, Brown, Ramik & Wight

[57] ABSTRACT

This disclosure relates to a novel retread mold which includes the usual matrices and bead wheels but additionally includes a cylindrical mandrel which forms an annular chamber adapted to receive a tire to be retreaded which when pressurized brings one of the bead wheels into forceful engagement with a locking arm carried by one of a pair of platens other than the platen carrying the last-mentioned bead wheel. Novel locking means include a threaded shaft carrying a nut to which is pivotally attached a plurality of locking arms cammed to a locking position with adjustment means being provided both relative to the locking means and to means which move the platens relative to each other to accommodate tires of different sizes.

25 Claims, 4 Drawing Figures

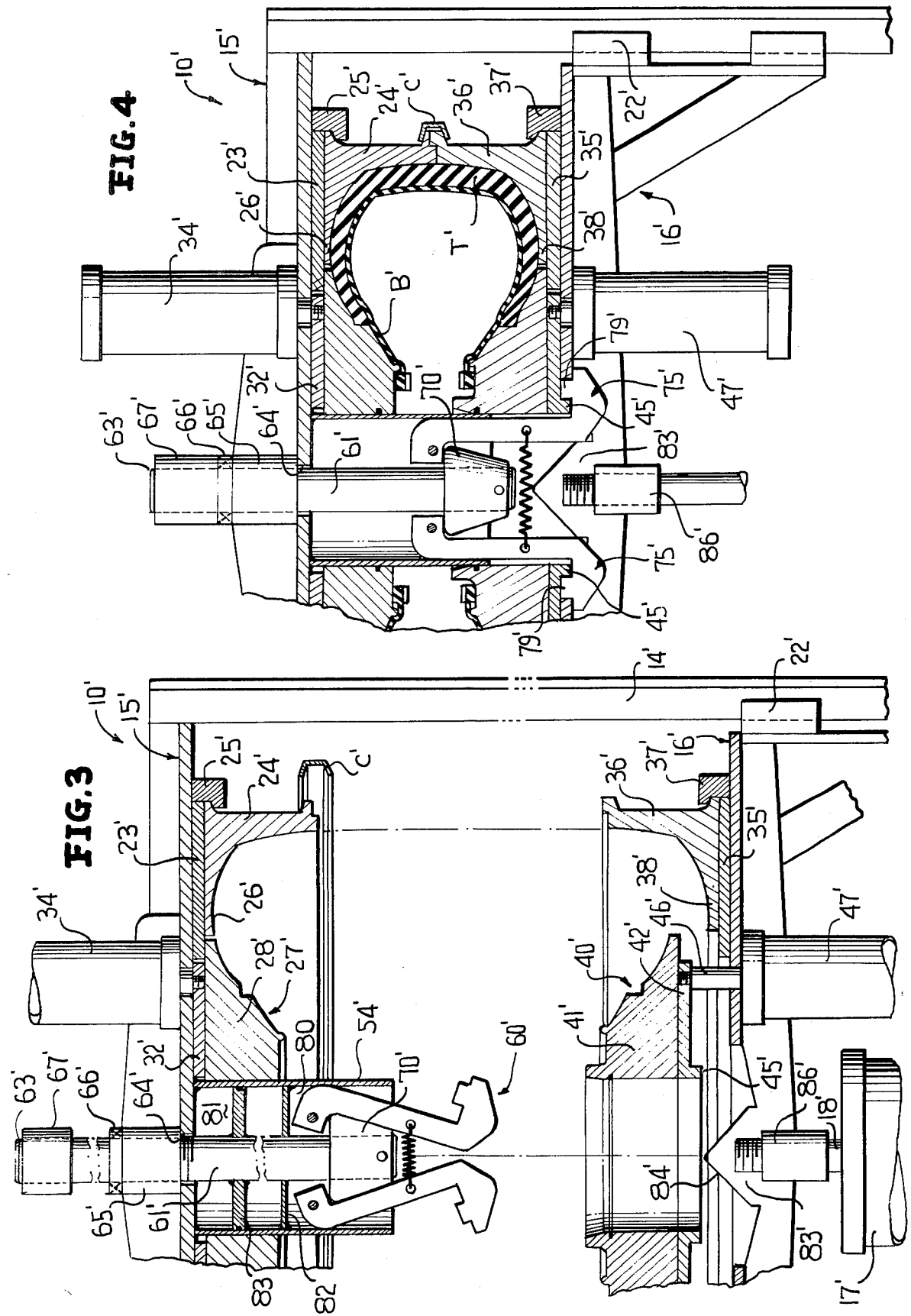

RETREAD MOLD WITH LOCKING MEANS

The present invention is directed to a novel retread mold which preferably though not necessarily utilizes full circle matrices, conventional bead wheels, and relatively movable platens. The design of the mold is such that conventional inside curing rims and/or curing tubes are eliminated, thus avoiding the expensive and labor demanding operation of installing the latter-noted elements during a retreading operation.

In keeping with the foregoing, a primary object of this invention is to provide a novel retread mold which includes first and second platens carrying relatively movable first and second bead wheels and matrices with means for moving the platens between open and closed positions in the latter of which the bead wheels and matrices define a generally annular chamber adapted to receive a tire to be retreaded, a first of the platens carrying a hollow mandrel, locking means also carried by the first platen, and the locking means including a pivotally attached locking arm for engaging beneath the bead wheel carried by the second platen whereupon pressurization of the annular chamber, the bead wheel of the second platen is forced into intimate locking engagement with the locking arm.

Still another object of this invention is to provide a novel retread of the type heretofore defined wherein each locking arm is loosely pivotally carried by a nut which is in turn threaded upon a threaded end portion of a threaded shaft, and the locking arm or a plurality thereof being supported by the nut against the internal pressure within the annular chamber.

Still another object of this invention is to provide a novel retread mold of the type heretofore described wherein the locking arm or arms are moved between retracted unlocked positions and expanded locked positions with the hollow mandrel serving as means for limiting or retaining the locking arms in the locked positions thereof.

A further object of this invention is to provide a novel retread mold of the type described wherein the second platen carries cam means which engage the locking arms to cam the same to their locked positions.

Yet another object of this invention is to provide a novel retread mold of the type described wherein the shaft or support member has another opposite threaded end portion carrying a nut for adjusting the position of the locking arms to adapt the mold for retreading tires of varying width.

A further object of this invention is to provide a novel retread mold of the type defined wherein the bead wheels include circumferential portions in overlapped supporting relationship to flanges of the associated matrices.

Still another object of this invention is to provide a retread mold as heretofore described including means defining a fluid chamber within the hollow mandrel which may be appropriately pressurized or depressurized to axially reciprocate the support member carrying the locking arms.

A further object of this invention is to provide a novel retread mold of the type described heretofore wherein the second platen is moved by a rod of an associated fluid motor, and adjustable means are provided for securing the rod to the second platen for varying the distance between the platens in the closed position thereof.

With the above and other objects in view that will hereinafter appear, the nature of the invention will be more clearly understood by reference to the following detailed description, the appended claimed subject matter, and the several views illustrated in the accompanying drawings.

In the Drawings:

FIG. 3 is a fragmentary elevational view partially in cross-section similar to FIG. 1 and illustrates another embodiment of the invention in which the locking means may be optionally provided with a fluid motor to raise the locking means in the open position of the platens to prevent ready access for inserting or removing a tire from between the matrices.

FIG. 4 is a fragmentary sectional view of the retread mold of FIG. 3 and illustrates the same in its closed and locked position.

Figure 1:
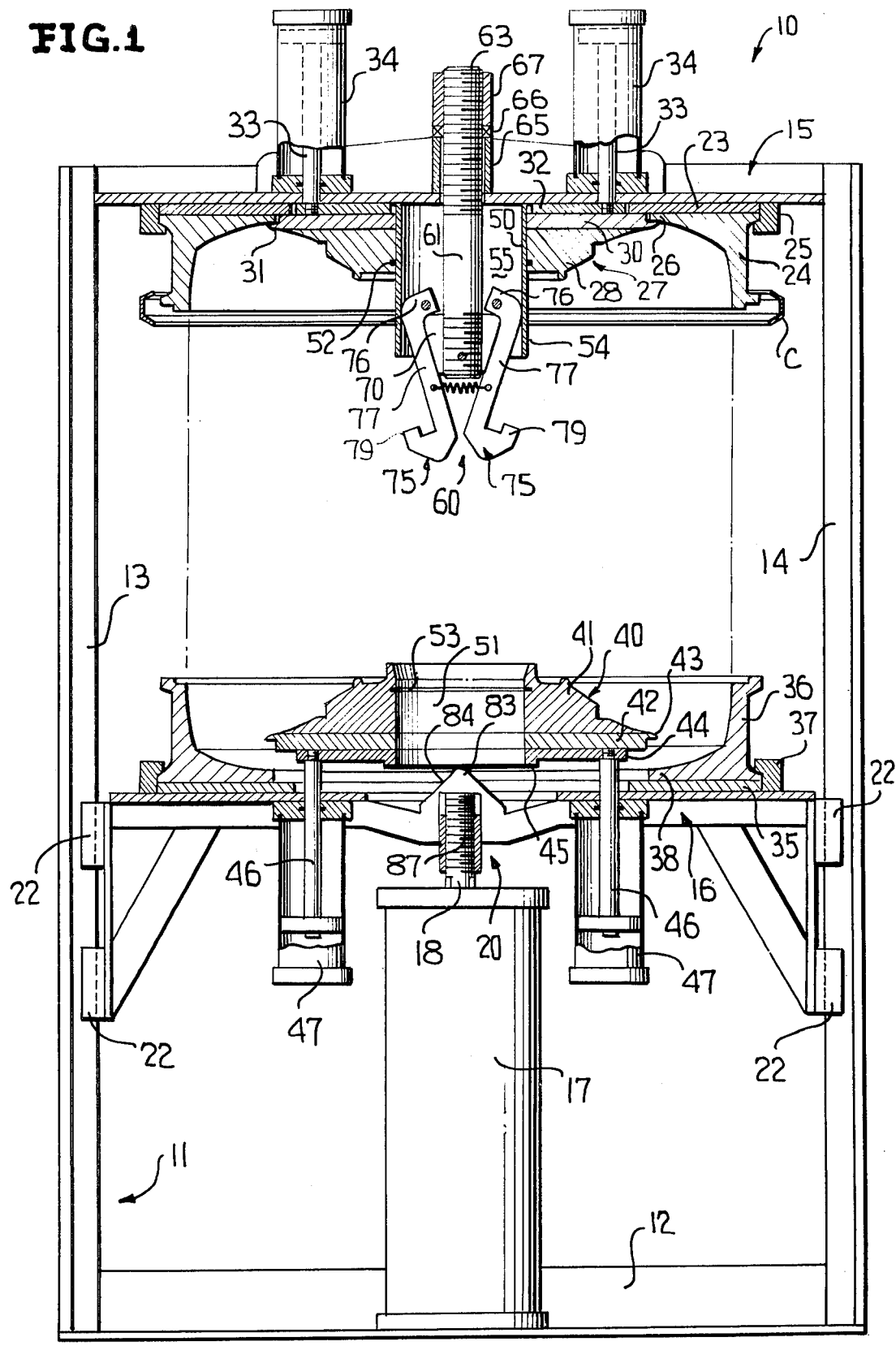
FIG. 1 is a side elevational view with portions thereof broken away and shown in section, an illustrates a pair of relatively reciprocal platens carrying matrices and bead wheels and an upper one of the platens carrying a hollow cylinder within which is housed locking means operative upon the closing of the platens and associated matrices.
Figure 2:
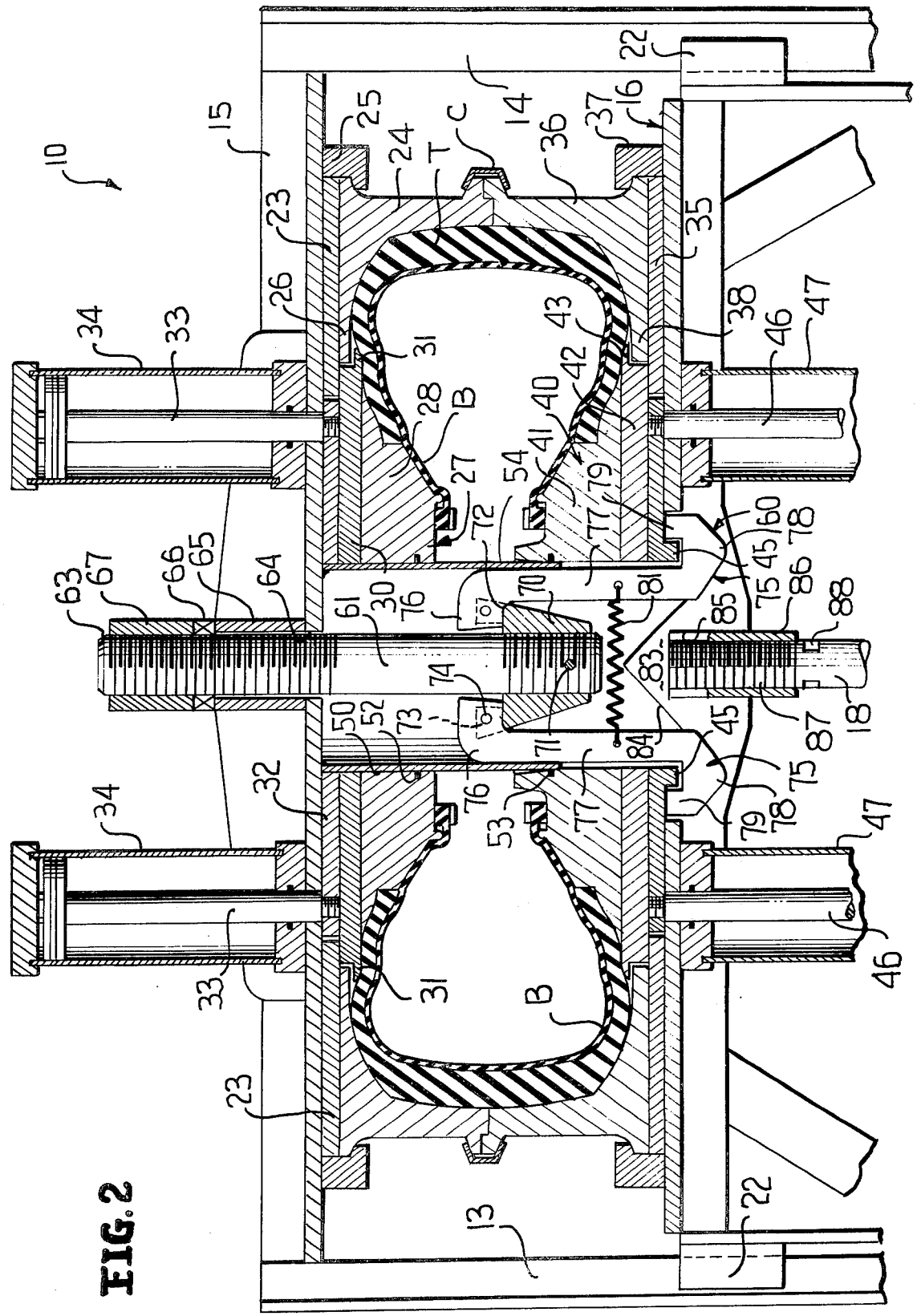
FIG. 2 is a fragmentary enlarged sectional view of the retread mold of FIG. 1, and illustrates the same in the closed position with an annular chamber formed by the matrices and aligner wheels being sealed by the mandrel and locking arms securely locking the upper platen to the lower bead wheel.

A novel retread mold or machine constructed in accordance with this invention is illustrated in FIGS. 1 and 2 of the drawings, and is generally designated by the reference numeral 10. The retread mold 10 includes a frame 11 having a base 12 and a pair of vertical rails or guides 13, 14 atop which is secured by welding or the like a first platen 15. A second platen 16 is reciprocated toward and away from the first platen 15 by a fluid motor which includes a cylinder 17 having suitable inlets and outlets and a piston rod 18 connected by means 20 to be described more fully hereinafter to the platen 16. The plate 16 includes U-shaped brackets 22 which receive the guide rails 13, 14 in an embracing fashion to guide the motion of the platen 16 toward and away from the platen 15 in a conventional manner.

An annular plate 23 is sandwiched between the platen 15 and a first full circle matrix 24 secured to the platen 15 by conventional removable clamps 25. The mold 10 is defined for operation specifically with a full circle matrix 24 but the latter may be substituted for by a segmented matrix, if desirable. The matrix 24 includes an inboardment peripheral flange 26 radially inboard of which is a first bead wheel or bead aligner wheel 27. The bead aligner wheel 27 includes a conventional bead plate 28 suitably connected to a side wall plate 30 having a radially outwardly directed circumferential lip 31 which overlies the flange 26 of the matrix 24, as is best illustrated in FIG. 2. Another annular plate 32 is connected to the plate 30 and is also connected to piston rods 33 of a pair of cylinders 34 having suitable inlets and outlets (not shown) connected to a source of pressurized fluid and/or a reservoir for reciprocating the piston rods 33 in a conventional manner.

An annular plate 35 is likewise sandwiched between a second matrix 36 and the platen 16 with the matrix 36 being removably connected to the platen 16 by conventional removable clamps 37. The matrix 36 also includes a radially inboardmost flange 38.

A bead wheel or bead aligner wheel 40 includes a conventional bead plate 41 and a side wall plate 42 secured thereto in a conventional manner. The side wall plate 42 also includes a radially outwardly directed circumferential lip 43 which overlies the flange 38 of the matrix 36 in the manner best illustrated in FIG. 2. The side wall plate 42 is connected to another annular plate 44 which has an innermost axially downwardly directed peripheral flange 45. The plate 44 is connected to a pair of piston rods 46 mounted for reciprocal motion in cylinders 47 having appropriate inlets and outlets (not shown) for reciprocating the bead wheels 40 in a conventional manner.

The bead wheels 27, 40 defined by the collective elements 28, 30, 32 and 41, 42 and 44 have respective cylindrical openings 50, 51 which are in axial alignment and each bead plate 28, 41 has a circumferential slot (unnumbered) in which is received respective O-ring seals 52, 53. A hollow cylindrical mandrel 54 having an internal chamber 55 is welded or otherwise secured to the platen 15 and the dimension of the outer surface (unnumbered) of the mandrel 54 is such as to form a seal with the O-ring seals 52, 53 particularly in the closed position of the platens and matrices, as is most evident in FIG. 2 of the drawings.

Locking means generally designated by the reference numeral 60 is in part carried by the upper or first platen 15 and cooperates with the axially downwardly directed flange 45 of the bead wheel 40 carried by the lower platen 16 in a manner to be described more fully hereinafter.

The locking means 60 includes a support member or shaft 61 having a lower threaded end portion 62 and an upper threaded end portion 63. The upper end portion 63 of the shaft 61 passes through an opening 64 of the platen 15 and a tubular sleeve 65 welded to the platen 15. A suitable bearing 66 is disposed between an upper face (unnumbered) of the sleeve 65 and a nut 67 threaded to the upper end portion 63 of the supporting member or shaft 61.

A nut 70 is threaded upon the lower end portion 62 of the shaft 61 and may be locked in a desired position by means of a pin 71 passing through a bore (unnumbered) in the nut 70 and the threaded end portion 62 of the shaft 61. The nut includes an upper supporting face 72 and a plurality of flanges 73 having slots or openings (unnumbered) formed therein to receive pins 74 which pass through openings or slots (unnumbered) of a plurality of locking arms 75. The openings in the flanges 73 and the locking arms 75 are appreciably larger than the diameter of the pins 74 to allow the locking arms 75 to be loosely pivotally connected to the nuts 70 so that lower surfaces (unnumbered) of terminal end portions 76 of each locking arm 75 rests upon the upper face 72 of the nut 70. Each of the locking arms 75 is generally of an S-shaped configuration defined by the terminal end 76, a midportion 77, a bight portion 78, and a terminal end portion 79 directed toward the platen 15. The locking arm 75 are normally biased to their unlocking position (FIG. 1) by a tension spring 81 suitably connected to the midportion 77 of the locking arm 75 of appropriate openings (unnumbered) which receive hooked ends (not shown) of the springs 71. Though only two locking arms 75 are illustrated, it is to be understood that more or less than this number may be employed in keeping with the present The locking arms 75 are moved from their unlocked positions (FIG. 1) to their locked positions (FIG. 2) by cam means 83 which includes a conical cam surface 84 of the cam means 83 which is integrally formed as a part of the lower platen 16. The cam means or integral portion 83 of the platen 16 includes a cylindrical bore 85 in which is secured an internally threaded sleeve 86 which receives a threaded end portion 87 of the rod 18 of the cylinder 17. The rod 18 further includes a plurality of rectangular recesses 88 adjacent the threaded end portion 87 to increase or decrease the distance of the threaded end portion 87 within the threaded sleeve 86 which in turn varies the distance between the platens 15, 16 in their closed position to accommodate matrices 24, 36 of different sizes. A suitable wrench-like tool is simply applied to the notches 88 and the rod 18 rotated in an appropriate direction to thread the same into or unthread the same outwardly from the sleeve 86. Inasmuch as the lower end (not shown) of the rod 18 merely carries a piston, the same may freely rotate within the cylinder 17 to in effect increase or decrease the length of the stroke of the rod 18 and thus the distance of movement of the platen 16 between its open (FIG. 1) and closed (FIG. 2) positions.

Though the retread mold 10 is designed specifically to be utilized in the absence of an annular curing bag, such a bag B has been illustrated in FIG. 2 simply as an alternative to the preferred operation of the machine 10 in the retreading of a tire T.

Assuming that the retread machine 10 is in its open position (FIG. 1) with the locking means 60 in the unlocked position thereof and the bead wheel 40 raised slightly by the introduction of pressurized fluid into the cylinder 47 beneath the pistons (unnumbered) carried by the rods 46. A typical retreading operation is initiated by simply inserting a properly prepared tire upon the bead plates 41 of the lower bead wheel 40. The bladder B is inserted in the tire T before insertion into the matrix 36 but, again, the bladder B need not be utilized. Pressurized fluid is then introduced into the cylinder 17 at which time the rod 18 moves upwardly to raise the platen 16 until such time as the matrices 24, 36 are fully closed (FIG. 2) after which the same may be secured to each other by a conventional clamping band C. During this closing motion, the mandrel 54 is progressively telescopically slid into the opening 41 of the bead wheel 40, and during this same movement the conical cam surface 84 of the cam means 83 contacts the bight portions 78 of the locking arms 75 and pivots the latter from the unlocked position (FIG. 1) to the locked position (FIG. 2). However, at this time, the bead wheel 40 is still raised slightly, as shown in FIG. 1, even though the matrices 24, 36 are closed and clamp-locked by the clamping ring C. Thus, at this point, the terminal ends 79 are positioned exactly as shown in FIG. 2, except they are not in contact with the annular plate 44 inboard of the flange 45. Thereafter, the interior of the bladder B is pressurized or in the absence of the bladder B, the annular chamber (unnumbered) defined generally by the matrices 24, 36, the bead wheels 27, 40 and the mandrel 54 is pressurized to seat the tire properly within the annular chamber which is, of course, provided with additional seals beyond the seals 52, 53 to preclude air, steam, or other media from escaping from the interior of the annular chamber during a vulcanizing operation. As the pressure within the annular chamber increases, it overcomes the pressure within the cylinders 47 forcing the bead wheel 40 in a downward direction from the position shown in FIG. 1, again while the matrices 24, 36 are totally closed, until the bead wheel 40 reaches the position shown in FIG. 2 at which time the plate 44 is brought into forceful engagement with the terminal end portions 79 of each of the locking arms 75 inboard of the axially downwardly directed peripheral flange 45. In this manner, the upper platen 15 is securely locked to the lower bead wheel 40 and unlocking therebetween cannot occur until the rod 18 is retracted, the pressure in the annular chamber is reduced or eliminated, and the pressure in the cylinders 47 is sufficient to raise the bead wheel 40 sufficiently for the flange 45 to clear the terminal ends 79 of the locking arms 75 at which time the spring 81 pivots the arms 75 to their unlocked position.

Due to the construction of the retread mold 10 just described, the bladder B need not be utilized because the annular chamber is sealed at its radially inboardmost periphery by the mandrel 54 and the O-ring seals 52, 53 associated therewith, it being understood that with the outboard of the seals 52, 53, there are provided other conventional seals to prevent leakage in a conventional and known manner. Thus, not only is the bladder B unnecessary, but conventional curing rims need not be utilized since the mandrel 54 functions, in effect, as a curing rim to provide a seal for fluid media media introduced into the tire T in the absence or presence of the bladder B. Moreover, as long as there is pressure in the annular chamber, the bead wheels are in a positively locked position due to the interlock between the lower bead wheel 40 and the upper platen 15. Moreover, due to the overlap between the lips 31, 43 and the respective matrix flanges 26, 38, the internal pressure acting upon the bead wheels 27, 24 assures that the lips 31, 43 contact and support the respective flanges 23, 38 of the respective matrices 24, 36.

As was heretofore noted, the means 20 permits a variation in the distance between the platens 15, 16 in the closed position thereof to accommodate matrices of widths other than those illustrated. Thus, as any change is made by virtue of the adjusting means 20, a like change will be required to interlock the terminal ends 79 of the locking arms 75 with the bead wheel 40. The latter change is accommodated by threading or unthreading the nut 67 to respectively lower or raise the shaft 61 relative to the platen 15 thereby achieving like locking with different size matrices and/or bead wheels.

Likewise, the nut 70 may be appropriately raised or lowered by, of course, removing and reinserting the pins 71 in the bores (unnumbered) associated with the nut 70 and the shaft 61 to vary the effective overall length of the locking means 60, or more specifically, the distance between the end faces (unnumbered) of the terminal end 79 of the locking arms 75 and the platen 15 carrying the shaft 61.

In lieu of the flanges 73 carried by the nut 70, the flanges 73 can be totally eliminated and the pins 74 may be secured suitably mounted in elongated vertical slots in the mandrel 54 so that as the nut 70 is rotated, the arms 75 may be moved upwardly or downwardly as the pins 74 move in the slots (not shown) associated with the mandrel 54. By this constructions, the upper terminal ends 76 of the locking arms which are, of course, generally S-shaped in side elevation will at all times rest upon the upper face 72 of the nut 70 which is highly desirable because the loading or locking forces upon the pressurization of the interior of the annular chamber will not be applied to the pins 74 but will instead be directly applied to the upper face 72 of the more massive nut 70 thereby assuring long life and absence of pin (74) breakage.

Another machine constructed in accordance with this invention is illustrated in FIGS. 3 and 4 of the drawings and like components bear like though primed reference numerals corresponding to those of FIGS. 1 and 2. The machine 10' of FIGS. 3 and 4 differs from the machine 10 of FIGS. 1 and 2 in but two respects, namely, the absence in the machine 10' of the lips 31, 43 on the respective plates 30', 42' of the respective bead wheels 27', 41' and the provision of an optional pneumatic means, generally designated by the reference numeral 80 associated with the locking means 60'. The pneumatic means 80 includes a chamber 81 defined by a plate 82 welded at its outer periphery (unnumbered) to the internal surface (unnumbered) of the mandrel 54'. The shaft 61' freely passes through an opening (unnumbered) in the plate 82 and a piston 83 is connected to the shaft 61' and at its outer periphery has a suitable O-ring seal (unnumbered). Suitable inlets and outlets (not shown) are provided for the chamber 81. The purpose of the means 80 is to retract the locking means 80' upwardly when the platens 15', 16' are in their open position (FIG. 3) to provide more ready access for loading and unloading purposes. Upon the introduction of a pressurized fluid media between the plate 82 and the piston 83, the shaft 61' is raised upwardly and the locking means 60' retracted within the mandrel 54' while opposite pressurization of the chamber 81 returns the locking means 60' to its lowermost position.

While preferred forms and arrangement of parts have been shown in illustrating the invention, it is to be clearly understood that various changes in details and arrangement of parts may be made without departing from the scope and spirit of this disclosure.

I claim:

1. A retread mold comprising first and second platens, means for imparting relative movement to said platens between open and closed positions, a first matrix carried by said first platen, a second matrix carried by said second platen, said matrices defining an annular chamber adapted to receive a tire when said platens are in the closed position thereof, a first bead wheel carried by said first platen, a second bead wheel carried by said second platen, a mandrel carried by said first platen and projecting toward said second platen, said first and second bead wheels having respective first and second openings therein for telescopically receiving said mandrel in the closed position, locking means for locking said first platen to said second bead wheel, said locking means including a support member at least partially housed in said mandrel, at least one locking arm movably carried by said support member, said locking arm being movable between a first unlocked position in the open position of said platens and a second locked position in the closed position of said platens, said locking arm having a terminal end for engaging a portion of said second bead wheel in an area axially beyond any radial plane through said annular chamber, said locking arm extending through said second opening in said second locked position, and said terminal end being positioned further from the axis of said annular chamber in said locked position than in said unlocked position.

2. The retread mold as defined in claim 1 including means for variably adjusting the axial length of said locking means to accommodate matrices of different widths between said platens.

3. The retread mold as defined in claim 1 including means for moving said locking arm in said unlocked position to said locked position, said moving means being immovably fixed to and carried by said second platen, and said moving means being operative to move said locking arm from said unlocked to said locked position during the movement of said platens toward the closed position.

4. The retread mold as defined in claim 1 including means for moving said locking arm in said unlocked position to said locked position, said moving means being immovably fixed to and carried by said second platen, said moving means being operative to move said locking arm from said unlocked to said locked position during the movement of said platens toward the closed position, and means connecting said locking arm moving means to said platen moving means.

5. The retread mold as defined in claim 1 including means for moving said locking arm in said unlocked position to said locked position, said moving means being immovably fixed to and carried by said second platen, said moving means being operative to move said locking arm from said unlocked to said locked position during the movement of said platens toward the closed position, means connecting said locking arm moving means to said platen moving means, and said last-mentioned connecting means is axially adjustable to effect locking of said locking arm depending upon different distances of relative movement between said platens.

6. The retread mold as defined in claim 1 wherein said support member includes a threaded portion, a nut threaded upon said threaded portion, and said locking arm is carried by said nut.

7. The retread mold as defined in claim 1 wherein said support member includes a threaded portion, a nut threaded upon said threaded portion, and said locking arm is pivotally carried by said nut.

8. The retread mold as defined in claim 1 wherein said mandrel includes internal abutment surface means for abuttingly contacting said locking arm to retain the latter in its unlocked position.

9. The retread mold as defined in claim 1 wherein each matrix has an innermost peripheral flange, each bead wheel has an outermost circumferential edge, and adjacent ones of said flanges and edges are in axial overlapped relationship in said closed position.

10. The retread mold as defined in claim 1 wherein said mandrel is a hollow cylinder defining a fluid chamber, said support member being mounted for internal telescopic reciprocal movement within said fluid chamber, and means for introducing fluid into and withdrawing fluid from said fluid chamber to reciprocate said support member and retract said locking arm in a direction toward said first platen in the open position of said platen.

11. The retread mold as defined in claim 1 wherein said support member includes a threaded portion, a nut threaded upon said threaded portion, and said locking arm is loosely pivotally carried by said nut.

12. The retread mold as defined in claim 1 including a locking plate carried by said second bead wheel, said locking plate has an innermost peripheral portion, said locking arm terminal end engages said innermost peripheral portion in the closed position of said platens, and said innermost portion and said portion are the same.

13. The retread mold as defined in claim 1 including a locking plate carried by said one bead wheel, said locking plate has an innermost axially projecting peripheral flange, and said locking arm terminal end engages said locking plate radially outboard of said peripheral flange in said closed position.

14. The retread mold as defined in claim 2 wherein said support member includes opposite end portions, a first of said end portion carries said locking arm, a second of said end portions is threaded, and said variable adjusting means includes a threaded connection between said threaded end portion and one of said first and second platens for adjusting the distance of said locking arm to accommodate matrices of different widths between said platens.

15. The retread mold as defined in claim 2 wherein said support member includes opposite end portions, a first of said end portion carries said locking arm, a second of said end portions is threaded, said variable adjusting means includes a threaded connection between said threaded end portion and one of said first and second platens for adjusting the distance of said locking arm to accomodate matrices of different widths between said platens, said threaded connection is defined by a nut threaded upon said threaded second end portion, said support member is disposed in free sliding relationship to one of said platens, and said nut is on a side of said last-mentioned platen opposite to that of said locking arm.

16. The retread mold as defined in claim 3 wherein said locking arm moving means is a cam surface carried by said second platen which engages said terminal end during closing relative motion of said platens to move said locking arm from said unlocked to said locked position.

17. The retread mold as defined in claim 3 wherein locking arm moving means is a cam surface carried by said second platen which engages said terminal end during closing relative motion of said platens to move said locking arm from said unlocked to said locked position, said platen moving means includes a reciprocal member, means for reciprocating said reciprocal member, and means carried by said reciprocal member for axially adjusting said reciprocal member relative to said second platen to adjust the distance between said platens in the closed position thereof.

18. The retread mold as defined in claim 6 wherein said locking arm includes a second terminal end remote from said first terminal end, means loosely pivotally connecting said second terminal end to said nut, and said second terminal end being directly supported by an upper surface of said nut.

19. The retread mold as defined in claim 6 wherein said locking arm includes a second terminal end remote from said first terminal end, means loosely pivotally connecting said second terminal end to said nut, said second terminal end being directly supported by an upper surface of said nut and said locking arm is of a generally S-shaped configuration.

20. The retread mold as defined in claim 1 wherein said locking arm is a pivoted locking arm.

21. The retread mold as defined in claim 20 wherein said pivoted locking arm is carried by a shaft secured to said first platen.

22. The retread mold as defined in claim 20 wherein said pivoted locking arm is pivoted from a nut threaded upon a support member, and means carried by said support member for axially adjustably securing said support member to said first platen.

23. The retread mold as defined in claim 21 wherein said mandrel is a hollow mandrel in internal telescopic relationship to said bead wheels in said closed position, and said shaft is disposed internally of said mandrel.

24. The retread mold as defined in claim 1 wherein said portion engaged by said terminal end lies outside said second opening.

25. A retread mold comprising first and second platens, means for imparting relative movement to said platens between open and closed positions, a first matrix carried by said first platen, a second matrix carried by said second platen, said matrices defining an annular chamber adapted to receive a tire when said platens are in the closed position thereof, a first bead wheel carried by said first platen, a second bead wheel carried by said second platen, a mandrel carried by said first platen and projected towards said second platen, said first and second bead wheels have respective first and second openings therein for telescopically receiving said mandrel in the closed position, locking means for locking said first platen to said second bead wheel, said locking means including a support member at least partially housed within said mandrel, at least one locking arm movably carried by said support member, said locking arm being extended longitudinally from within said mandrel and extending through said second opening when said platens are in the closed position thereof, said locking arm being movable between an unlocked position in the open position of said platens and a locked position in the closed position of said platens, said locking arm having a terminal end for engaging a portion of said second bead wheel, said portion being adjacent said second opening and axially beyond any radial plane through said annular chamber, said terminal end being retained by said portion when said platens are in the closed position, said terminal end being positioned adjacent the axis of said annular chamber in said unlocked position and further from said axis in said locked position, means for moving said terminal end from said unlocked position to said locked position, said moving means being immovably fixed to and carried by said second platen, and said moving means being operative to move outwardly said terminal end from said axis to engage said portion in said locked position during the movement of said platens toward the closed position thereof.

* * * * *